April 23, 1957 G. MACKAS 2,789,428
GUN TUBE TEMPERATURE SIMULATOR
Filed July 24, 1952 7 Sheets-Sheet 1

INVENTOR
GEORGE MACKAS
BY
ATTORNEYS

April 23, 1957 G. MACKAS 2,789,428
GUN TUBE TEMPERATURE SIMULATOR
Filed July 24, 1952 7 Sheets-Sheet 3

INVENTOR
GEORGE MACKAS

BY
ATTORNEYS

April 23, 1957 G. MACKAS 2,789,428
GUN TUBE TEMPERATURE SIMULATOR
Filed July 24, 1952 7 Sheets-Sheet 4

INVENTOR
GEORGE MACKAS
BY
ATTORNEYS

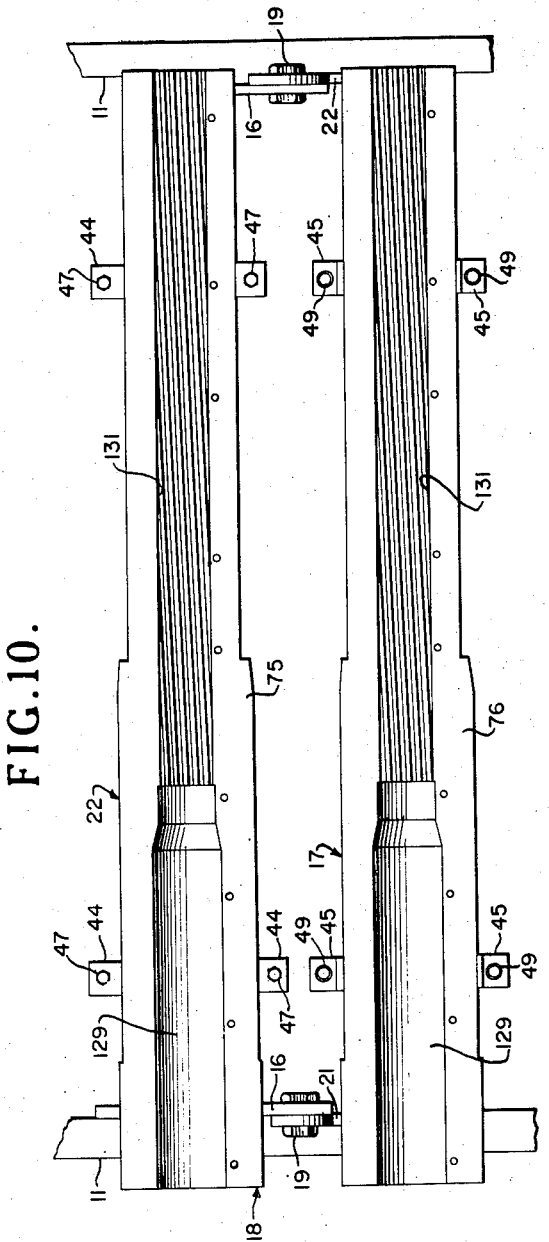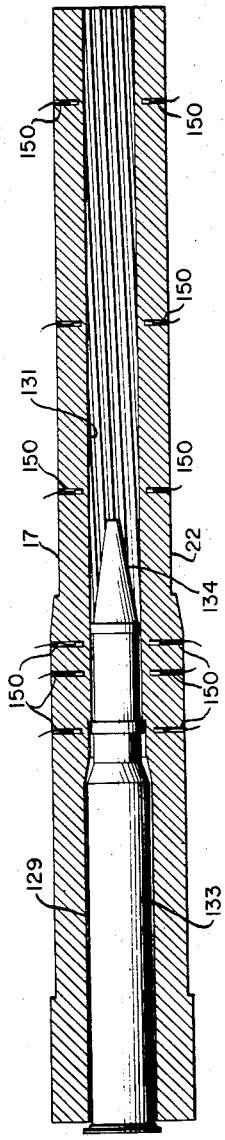

April 23, 1957  G. MACKAS  2,789,428
GUN TUBE TEMPERATURE SIMULATOR

Filed July 24, 1952  7 Sheets-Sheet 6

INVENTOR
GEORGE MACKAS

BY
ATTORNEYS

United States Patent Office 2,789,428
Patented Apr. 23, 1957

2,789,428

GUN TUBE TEMPERATURE SIMULATOR

George Mackas, Washington, D. C., assignor to the United States of America as represented by the Secretary of the Navy Application July 24, 1952, Serial No. 300,794

5 Claims. (Cl. 73—15)

(Granted under Title 35, U. S. Code (1952), sec. 266)

The invention described herein may be manufactured and used by or for the Government of the United States of America for governmental purposes without the payment of any royalties thereon or therefor.

The present invention relates to a gun tube temperature simulator and more particularly the invention relates to apparatus for simulating in a gun tube the temperatures developed therein after a large number of rounds of ammunition have been fired therefrom.

It is not economically feasible to fire a large number of rounds of ammunition in order to produce in the gun tube the heat necessary for carrying on tests of the effects of such heat on fuzes or other devices in the gun tube. There is danger under such conditions that a cartridge may become stuck in the gun because of mechanical failure and, by reason of the transfer of heat, to explode when not removed quickly. It has, also, been found impractical to produce the desired heat by applying heat by gas burners or other means interiorly of the gun.

The device of the present invention makes use of a standard gun tube which has been somewhat shortened and which has been cut into two equal portions along the length thereof, provision being made for fixedly supporting one half of the gun tube and hingedly connecting the two halves together. The halves of the gun tube are heated in open condition over a pair of banks of variable heat producing devices. In this manner the heat produced or stored in the gun tube may be varied along the length thereof in accordance with the heat encountered in gun tubes under service conditions.

As is well known, gun barrels become very hot when used for rapid fire. When a gun fails to fire, the problem arises of removing the ammunition from the gun. If the gun is hot enough and the ammunition remains in the gun a sufficient length of time, the projectile fuze, the explosive charge, or the propellant powder may "cook off" or explode because of transfer of heat to such explosive components.

The device of the present invention produces such heat at the temperature and locations along the length of the gun as they are encountered under service conditions primarily for the purpose of testing fuzes, the fuzes being mounted in dummy projectiles and inserted in the gun breach after the halves are heated and clamped together. The temperatures of the critical portions of the gun tube are made known by a plurality of thermocouples or other temperature indicating devices mounted at various depths and locations in radial bores in the tube and connected in a high speed recorder circuit.

An object of the present invention is to provide a convenient and improved apparatus for producing heat in a gun barrel to simulate heat developed therein under service conditions.

Another object is to provide an improved apparatus for testing fuzes under a simulation of conditions normally encountered in a gun barrel.

A further object is to provide an improved fuze testing apparatus which simulates service conditions in an economical manner.

A still further object is to provide apparatus for measuring the temperatures developed within a test gun tube in order to bring such temperatures in coincidence with known values developed under service conditions.

A still further object is to provide a split gun barrel for testing a fuze which has a novel apparatus for clamping the split barrel together.

Other objects and many of the attendant advantages of this invention will be readily appreciated as the same becomes better understood by reference to the following detailed description when considered in connection with the accompanying drawings wherein:

Fig. 10 is a bottom plan view of the two gun sections in the open position;

Fig. 11 is a sectional view through the gun barrel, the sections being in the closed position and showing a fuze, projectile and cartridge case mounted therein;

Figure 1:
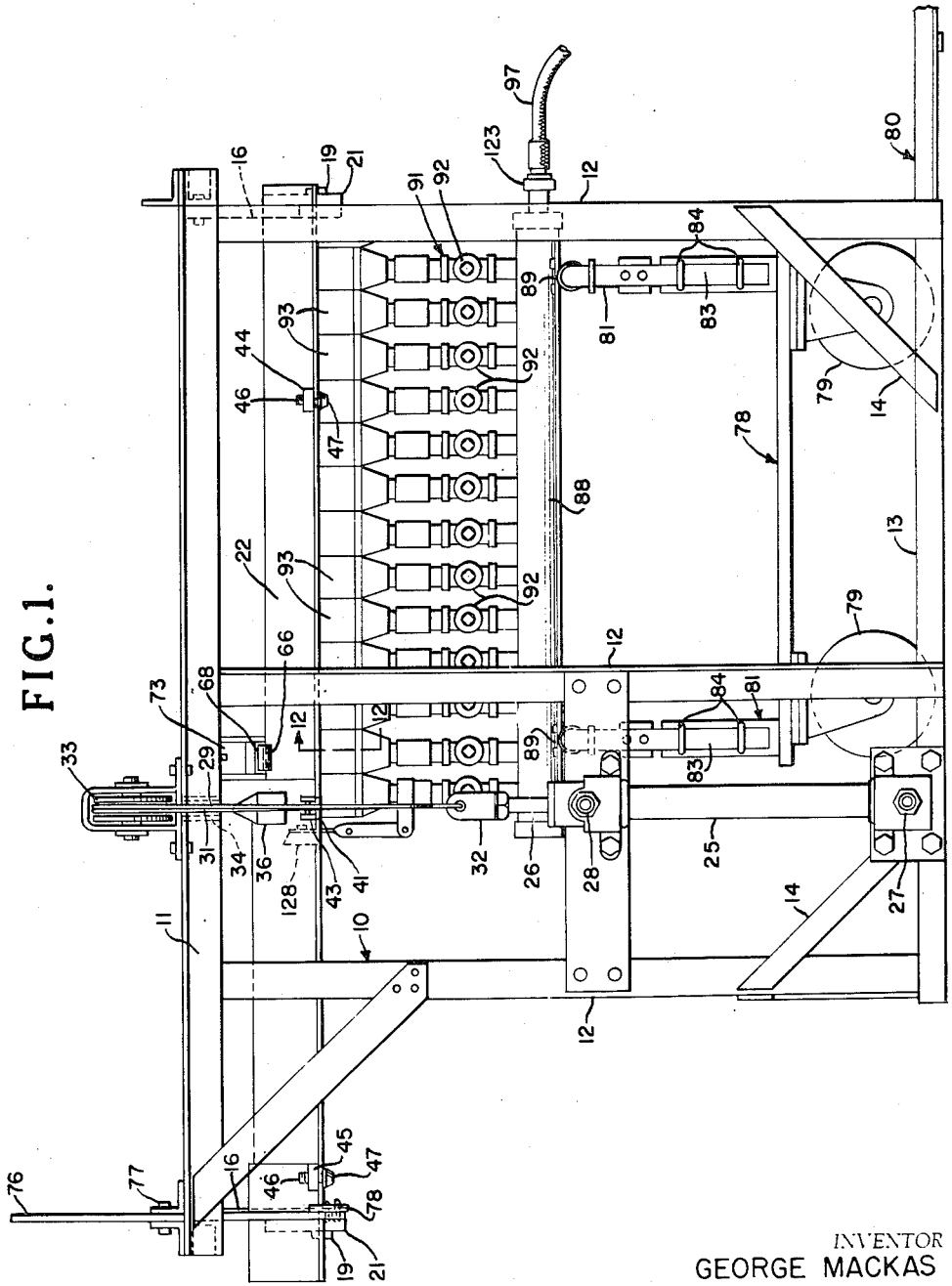
Fig. 1 is a side elevation of the gun tube temperature simulating apparatus of the present invention and showing the gas burner dolly rolled under the gun halves.

Referring more particularly to the drawings wherein like numerals indicate like parts throughout the several views, 10 indicates generally a frame comprising horizontal top member 11, vertical members 12, base members 13, and angular bracing members 14, Fig. 1.

Figure 2:
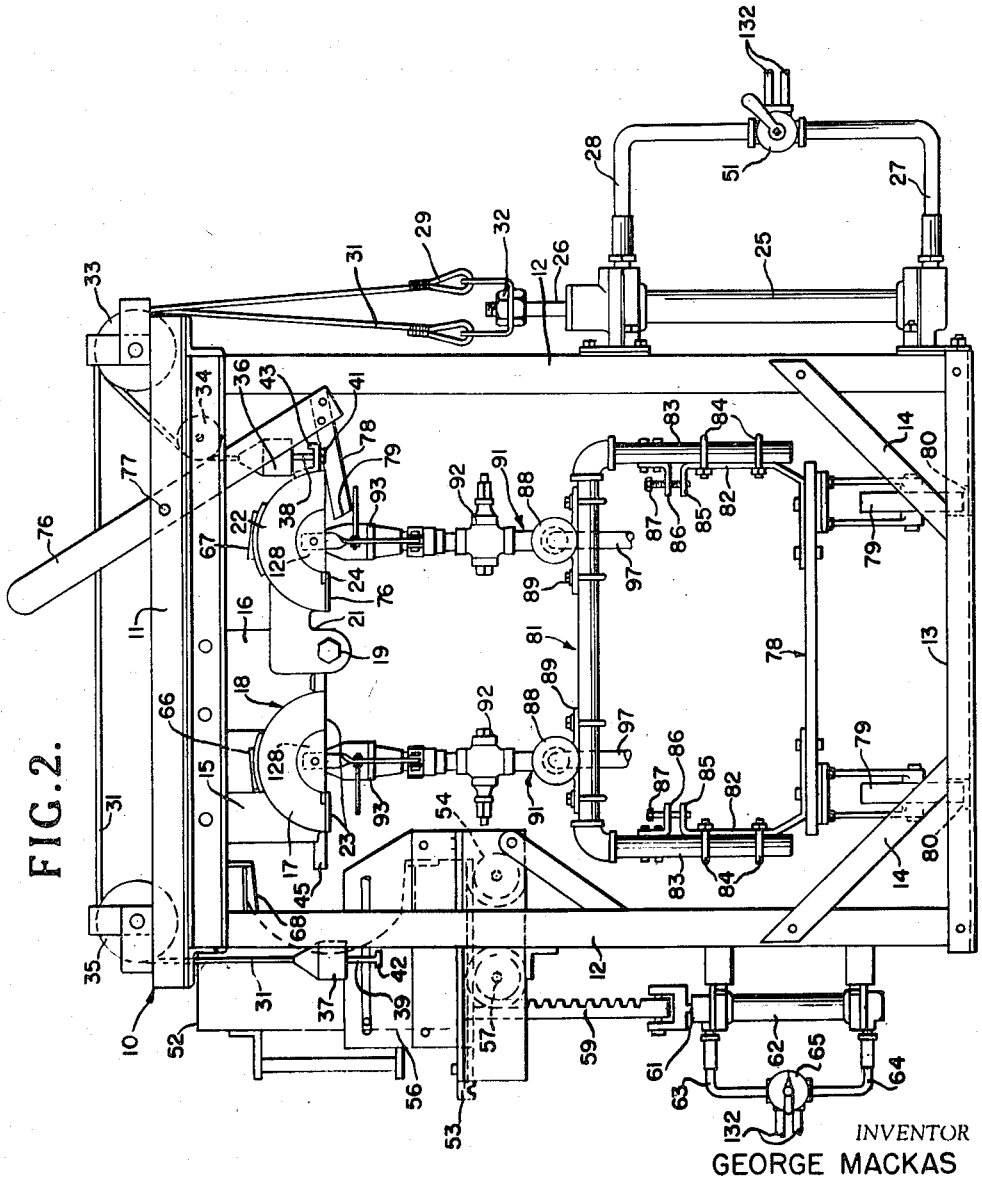
Fig. 2 is an end view of the apparatus of Fig. 1.
Figure 3:
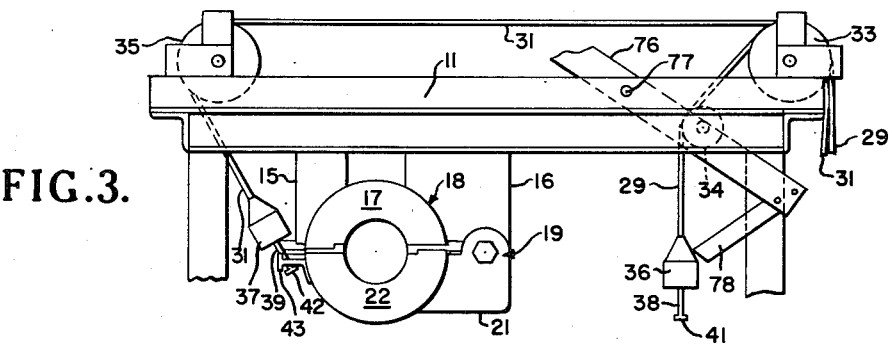
Fig. 3 is a detail view of the supporting structure for the gun tube and showing the tube halves in abutting relation.
Figure 4:
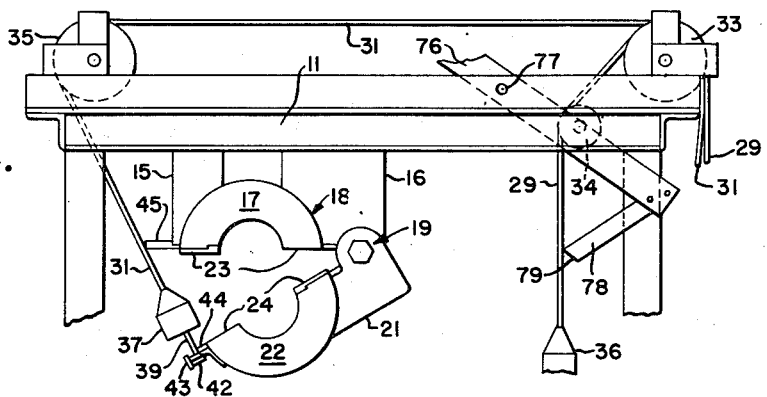
Fig. 4 is a view similar to Fig. 3 and showing the lower half of the gun tube being lowered by the closing cable.
Figure 5:
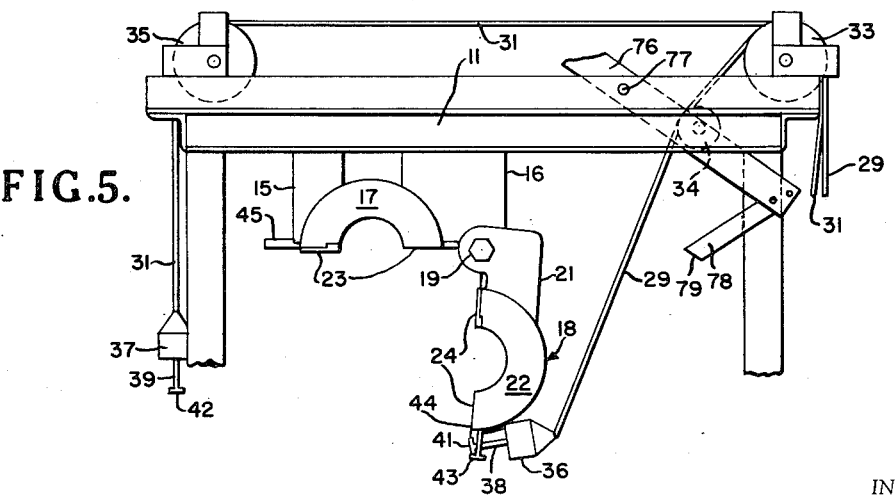
Fig. 5 is a view similar to Fig. 3 and showing the closing cable detached and the opening cable attached.

Secured to top members 11 are supports 15 and 16, Fig. 2, to which the half section 17 of gun 18 is welded or otherwise secured. Supports 16 also form a part of the hinges indicated generally at 19, the portion 21 thereof being welded or otherwise secured to half section 22 of gun 18. It will thus be seen that section 17 is fixed while section 22 is movable with respect thereto. The sections 17 and 22 form a substantially complete gun 18 when section 22 is moved on hinges 19 and faces 23 of section 17 and faces 24 of section 22 are brought into substantial abutting relation.

In order to move the section 22 with respect to section 17 on hinge 19, a hydraulic cylinder 25 is fastened to frame 10 and has a piston shaft 26 extending therefrom. Cylinder 25 has a lower hydraulic connection 27 and an upper connection 28, it being well understood that when fluid is forced into the lower connection 27 the piston shaft 26 will be forced upwardly, while when fluid is forced into the upper connection 28 the piton shaft 26 will move downwardly. Cables 29 and 31 are fastened to piston shaft 26 as at 32, Fig. 2, and pass upwardly over pulley 33. Cable 29 passes over pulley 34 which is on the near side of the gun 18, while cable 31 passes completely across the frame 10 and runs over pulley 35 on the opposite side of the frame 10. Cables 29 and 31 have depending therefrom weighted members 36 and 37 respectively. Threaded into member 36 and 37 are T bolts 38 and 39 having lock nuts 41 and 42, respectively.

Welded to the outside or non-hinge side of gun section 22 approximately midway the length thereof is a slotted ear 43 for receiving the T bolts 38 and 39, the purpose of which will be hereinafter more fully described.

In order to space gun sections 17 and 22, Fig. 10, in accurate alignment, a plurality of ears 44 is mounted on each side of section 22 and a plurality of ears 45 is mounted on both sides of section 17 and in alignment with ears 44. Ears 44 have threaded therein bolts 46 having tapered heads 47 while ears 45 have bores 48 formed therein the bores being tapered as at 49. When sections 17 and 22 are hinged into engagement the tapered heads 47 of bolts 46 enter the tapers 49 of bores 48 thus aligning the two sections 17 and 22. In order to provide for an accurate clearance between the two sections the bolts 46 are screwed in or out until such clearance is obtained.

In operation, let it be assumed that the gun section 22 is in the open position and it is desired to move the section to the closed position. A fluid control valve 51 is set to permit fluid to enter lower connection 27 of hydraulic cylinder 25 and to permit fluid to flow out of upper connection 28. It is also assumed that T bolt 38 is connected in the slot of ear 43 thus cable 29 supports section 22. As piston shaft 26 moves upwardly cable 29 passes over pulleys 33 and 34 and lowers section 22 to a depending position with respect to hinge 19. At this point T bolt 38 is removed from ear 43 and T bolt 39 of cable 31 is inserted therein. Valve 51 is now moved to a position to reverse the flow of fluid in the cylinder 25 thus lowering piston shaft 26, drawing cable 31 in a reverse direction pulling section 22 into the closed position with respect to section 17 of gun 18.

Figure 7:
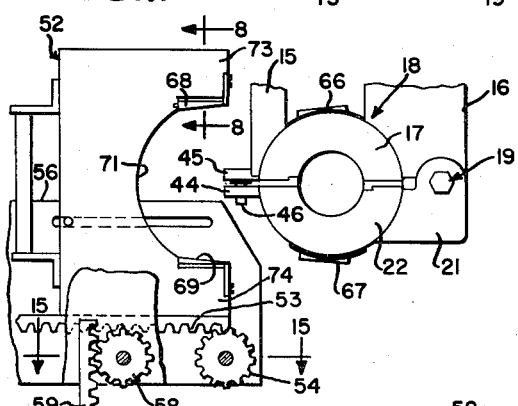
Fig. 7 is a detail sectional view showing the clamp for securing the halves of the gun tube together and the operating mechanism therefor.
Figure 8:
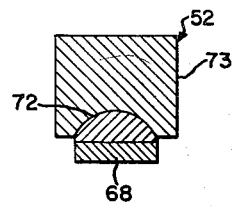
Fig. 8 is a sectional view taken along the line 8—8 of Fig. 7 and showing the self-aligning feature of the clamp jaw.
Figure 15:
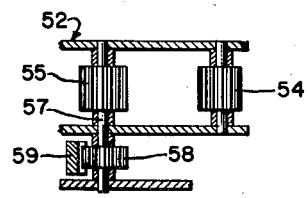
Fig. 15 is a sectional view taken along the line 15—15 of Fig. 7.
Figure 9:
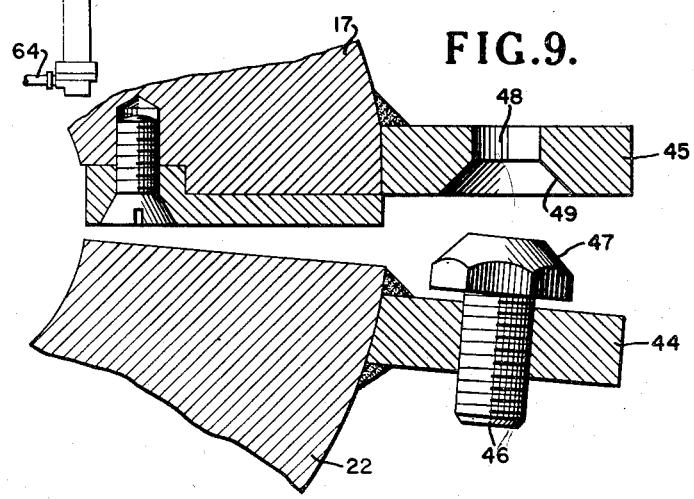
Fig. 9 is a detail sectional view of one of the aligning bolts for the gun sections.

With sections 17 and 22 of gun 18 in the closed position a clamping device 52 is employed to securely hold the two sections together, Fig. 7. Clamping device 52 has a rack bar 53 secured thereto at bottom thereof, the rack bar 53 engaging gears 54 and 55 which are journalled in guide frame 56. Gears 54 and 55 being mounted at the inner and outer extremities of frame 56. Gear 55 is fixedly mounted on shaft 57 which also has mounted thereon a gear 58. Gear 58 meshes with a vertically slideable rack bar 59 which is secured to the piston shaft 61 of hydraulic cylinder 62 having inlet and outlet connections 63 and 64 respectively.

The operation of cylinder 62 is similar to that of cylinder 25, the inlet and outlet connections 63 and 64 being connected to a control valve 65 whereby fluid under pressure from a tank and compressor (not shown) may be forced into either connection to raise or lower the piston shaft 61, thus raising or lowering the rack bar 59, rotating gears 58 and 55 and moving rack bar 53. In this manner the clamping device 52 is moved into or out of engagement with the gun 18.

Mounted respectively on the sections 17 and 22 are the tapered adapters 66 and 67, while matching tapered jaws 68 and 69 are mounted in the cut-out portion 71 of clamping member 52. As will be seen in the drawings, the jaws 68 and 69 are mounted for slight rocking motion as at 72 on supporting members 73 and 74 respectively thus to permit self-alignment of the jaws with respect to the adapters.

It is, of course, understood that the jaws 68 and 69 and the adapters 66 and 67 are formed of a very tough steel in order to prevent deterioration of the surfaces thereof. It is clear that the clamping member 52 will hold gun sections 17 and 22 in closed relation in a positive manner.

Figure 6:
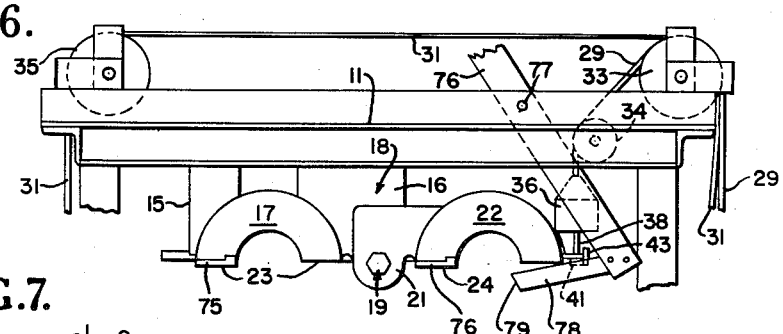
Fig. 6 is a view similar to Fig. 3 and showing the halves of the gun tube fully open and ready for heating.

In order to replace the metal lost in cutting the gun 18 in halves a series of metal plates 75 and 76 are respectively fastened to one each of the faces 23 and 24, as shown in the drawings, Fig. 6.

A latch-type member 76 is pivoted at 77 to one of the frame members 11 and has a right angle extension 78 adapted to engage one of faces 24 of the hinged half section 22 thus to safely retain the section in the open position. Extension 78 has on the lower side thereof an angular face 79 whereby the latch member rides over section 22 during movement thereof from the closed to the open positions.

A pair of angle iron rails 80 are secured to frame members 13 and extend beyond the frame 10 and across the floor of a room in which the foregoing apparatus is installed.

A cart or dolly 78, having rollers or wheels 79, is mounted on rails 80 for rolling movement from a position exteriorly of frame 10 to a position under the gun 18.

A structure 81 is supported on dolly 78 by brackets 82. Structure 81 has depending tubular legs 83 which are adjustably clamped to brackets 82 by U-bolts and nuts 84.

In order to provide for raising and lowering structure 81, brackets 82 have seat portions 85 formed thereon. Depending legs 83 have fixed thereto screw brackets 86 in which are threaded jack screws 87. It is clear that structure 81 may be raised or lowered by screws 87 when U-bolts 84 are loosened, the U-bolts being tightened to maintain structure 81 in adjusted position.

Figure 13:
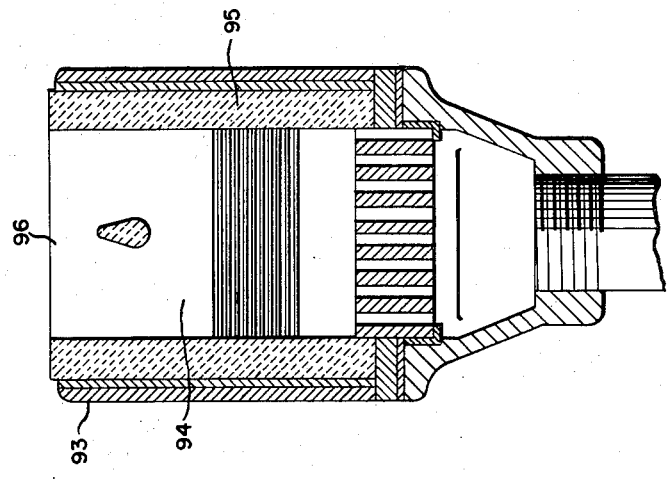
Fig. 13 is a sectional view taken along line 13—13 of Fig. 12.
Figure 12:
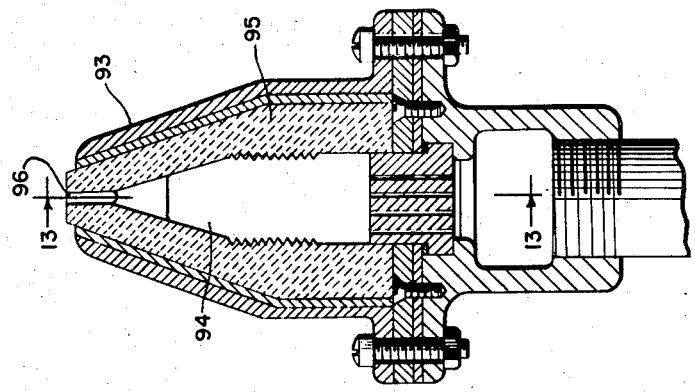
Fig. 12 is an enlarged sectional view taken along the line 12—12 of Fig. 1 and one of the burners.
Figure 14:
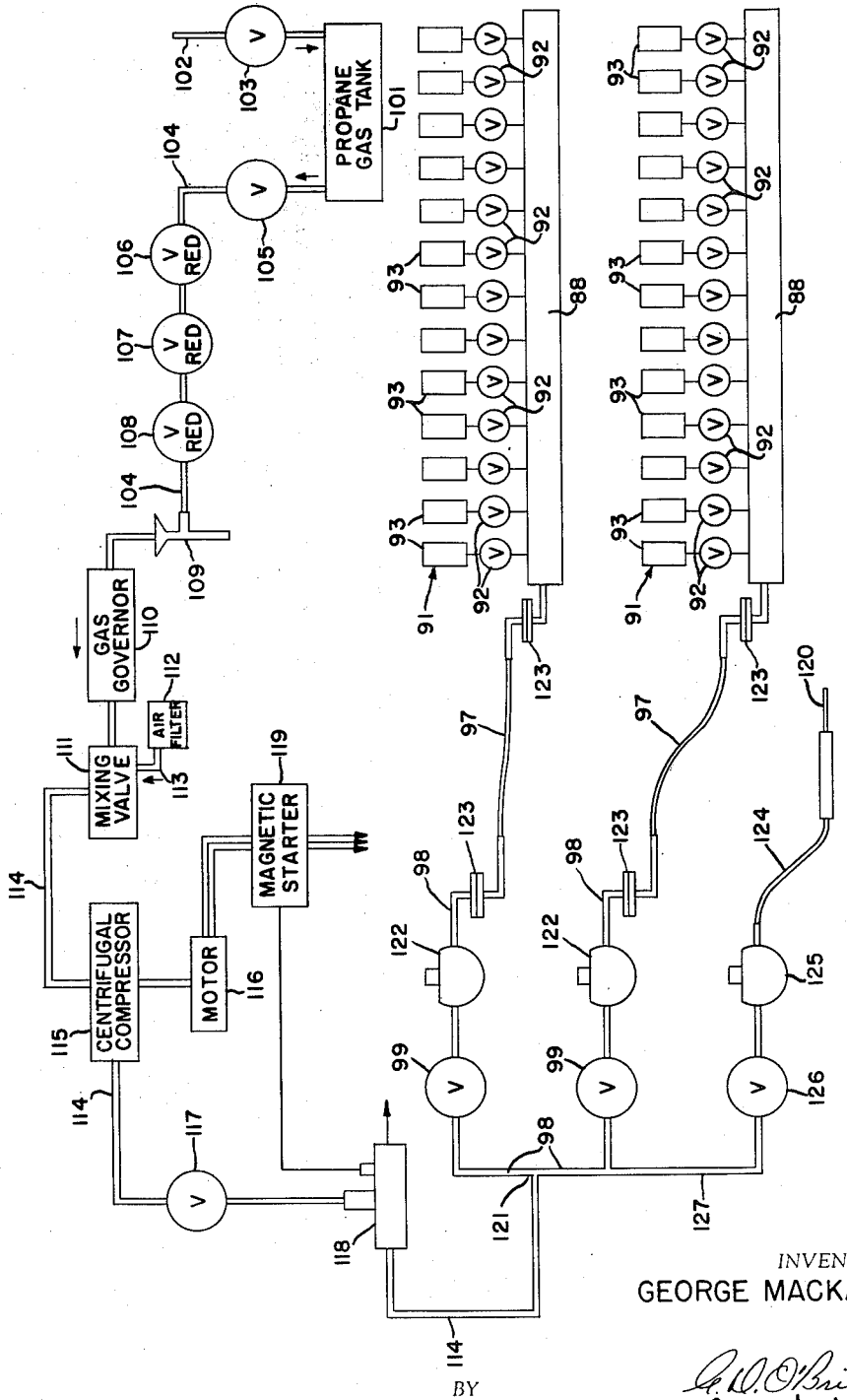
Fig. 14 is a diagram of the gas supply system for the burners.

A pair of manifold members 88 are mounted for lateral adjustment as at 89 on structure 81. Each manifold 88 has extending vertically therefrom a plurality of gas burner assemblies 91. Each burner assembly 91 comprises a regulator valve 92 and a burner 93. Burners 93 are of the superheat type and are fed a mixture of propane gas and air at about 6 to 8 inches water pressure by any suitable means such, for example, as shown in Fig. 14. Combustion takes place within the chamber 94 of the burners 93, Figs. 12 and 13, the burners being formed of cast iron and lined with refractory material 95 which becomes incandescent from the high heat developed within the chamber 94. The burner orifice 96 is long and narrow and produces a high velocity tongue-shaped flame. It is important that the burners be positioned a measured distance from the opened sections 17 and 22 of gun 18. If the burners are brought too close to the gun the heating will be fast and uneven, while if the burners are moved too far away the heat will be even and the temperature rise in the gun barrel will be slow. As aforesaid, each burner has a regulator valve 92 individual thereto. The purpose of these valves is to regulate each burner to produce the heat desired to be applied to the various portions of the gun barrel to simulate heat conditions encountered while firing large numbers of rounds of ammunition in a gun under field conditions.

The manifolds 88 are respectively connected to one end of the flexible tubes 97 which are connected at the other end thereof to supply pipes 98. It is, of course, understood that each bank of burners is provided with a shut-off valve 99. It is also understood that the gas is fed to the burners from a storage tank 101 having a filler pipe 102 with a shut-off valve 103 therein. Tank 101 is fitted with an outlet line 104 and shut-off valve 105. Line 104 is also provided with pressure reducing valves 106, 107, 108, the reducing valves being set in sequential order to reduce the pressure of the gas at valve 106 from tank pressure to 30 pounds per square inch, at valve 107 from 30 pounds per square inch to 5 pounds per square inch and at valve 108 from 5 pounds per square inch to 6 to 8 inch water pressure.

The gas continues through line 104 and through flow meter 109, which indicates the rate of flow of the gas. The gas enters a gas governor 110 for maintaining the pressure thereof constant with the pressure of the air with which the gas is to be mixed. The gas now enters mixing valve 111 for mixture of gas with air in the proportion of 15.6 pounds of gas per pound of air the air entering 111 through air filter 112 and connecting tube 113.

The mixture of gas and air passes from mixing valve 111 through pipe or line 114 into a centrifugal compressor 115 driven by electric motor or other source of power 116. The mixture continues through an extension of line 114, through shut-off valve 117, safety blowout 118, which vents excess pressure caused by "flashback" and shuts off motor 116 by operating motor control switch 119 thus shutting off compressor 115.

Line 114 continues from safety blowout 118 to a junction 121 from which the air and gas mixture passes into a pair of supply pipes 98 having shut-off valves 99 and automatic fire checks 122. In order to provide for greater flexibility swivel joints 123 are mounted at each end of flexible tubes 97. The flexible tubes are provided to permit rolling the cart or dolly 78 on rails 80 from a position within the frame 10 to a point exterior thereof.

A lighting torch 120 is provided having a flexible hose connection 124, fire check 125 and shut-off valve 126. Shut-off valve 126 is connected by a line 127 to one of the lines 98. Lighting torch 123 is, of course, for the purpose of lighting the plurality of burners 93.

The burner at one end of each bank is provided with a baffle 128, Figs. 1-2, the baffles 128 being shaped to fit the breach portion of the half sections of the gun and are adapted to confine the heat of the burners to the rifled bore 131 and to prevent heating of the cartridge chambers 129 thereof.

In operation, the gun sections 17 and 22 being separated, the split faces 23 and 24 of the sections facing downwardly, and the cart or dolly 78 being outside of frame 10, the burners 93 are ignited by lighting torch 120, the gas mixing and feeding system being in operation. When all burners 93 are ignited the cart 78 is rolled into frame 10 on tracks or rails 80 and brought to a stop when the burners are aligned with the rifled portions 131 of the gun sections, the baffles 128 being positioned to prevent heating of cartridge chamber portions 129.

It is, of course, understood that each regulator valve is set to provide a measured quantity of heat to that portion of the gun barrel heated by each burner so that the gun barrel may be heated at the various temperatures along the length thereof in accordance with known heat values as determined under actual firing conditions in the field.

In order to determine the temperatures of the gun sections as the burners are operating, a plurality of thermocouples 150 are provided in bores in both sections of the gun, the thermocouples being positioned at selected distances along the length fo the gun sections and at selected depths in a radial direction, the positions thereof being duplicated in each section. The thermocouples are formed of iron constantan insulated in glass fiber and forms a part of a temperature recording circuit (not shown) whereby the temperatures of the gun sections are recorded throughout the test.

When the gun sections 17 and 22 have reached the desired temperatures, the section 22 is lowered by withdrawing latch member 76, the T bolt 38 being engaged in slotted ear 43 of section 22 and by causing piston shaft 26 to move outwardly from cylinder 25 by permitting entry of fluid from the cylinder through lower connection 27 an to exhaust fluid through upper connection 28, the direction of travel of the fluid being selected by valve 51 which is connected to a fluid circulating system (not shown) by pipe 132. The flow of the fluid is slowed down to prevent rapid motion of section 22 thus to prevent damage to the various parts of the apparatus. When cable 29 has lowered section 22 to the bottom of the radius thereof, the T bolt 38 of cable 29 is released from ear 43 and T bolt 39 of cable 31 is engaged therein. The flow of fluid into cylinder 25 is reversed, moving piston shaft downwardly and, through cable 31 and T bolt 39, lifting section 22 to the closed position.

When sections 17 and 22 are in the closed position the clamp 52 is moved into engagement with the adapters 66 and 67 by operation of the hydraulic cylinder 62 which operates in the manner of cylinder 25 and is also connected to the aforementioned fluid circulating system by control valve 65 which operates in the manner of valve 51 and is also connected by pipes 132, Fig. 2, to the circulating system. It will be seen that as the piston shaft 61 moves outwardly of cylinder 62, rack 59 rotates gears 58 and 55, thus moving rack 53 and clamp 52 toward gun 18. By reversing the flow of fluid in cylinder 62 the clamp 52 is moved out of engagement with and away from the gun 18.

When gun sections 17 and 22 are firmly held by clamp 52 a dummy cartridge 133 having mounted thereon a fuze 134 to be tested, is inserted in the heated gun in the cartridge chamber 129 thereof. The heat of the gun is transfered gradually to the dummy cartridge and the fuze. It will thus be seen that the device of the present invention is particularly well suited for testing fuzes for use in guns and particularly to determine the length of time required to fire such fuzes when left in a hot gun barrel because of jamming or other mechanical failure.

Such tests may be carried on at small expense compared to the cost of firing many rounds of ammunition and danger is greatly reduced by the use of dummy cartridges, the only explosive being the detonator of the fuze which is an explosive of small consequence under such conditions.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. Apparatus for heat testing a fuze mounted on a dummy cartridge and comprising, in combination, a pair of complementary half sections of a gun barrel adapted to receive said dummy cartridge and fuze, a frame, one of said sections being fixed to said frame, the other of said sections being hinged to said frame to move from an open position to a closed position with respect to the said one section, said sections in the closed position forming in effect a complete gun barrel, means for heating said sections while the sections are in the open position, means for moving said other section to the closed position, and generally U-shaped clamping means mounted for sliding movement with respect to said gun sections and adapted to be disposed to engage the sections in the closed position and to prevent separation thereof upon firing of said fuze.

2. In an apparatus for heat testing a fuze mounted on a dummy cartridge and comprising, in combination, a supporting frame, a gun barrel, said gun barrel being divided along the length thereof to provide a pair of complementary gun sections, a first gun section of said pair being fixedly suspended from said frame, a second gun section of said pair being hingedly supported on said frame and adapted to be swung from an open position to a closed position with respect to said first gun section, said sections in the closed position forming in effect a complete gun barrel, hydraulically operated cable means for moving said second gun section, a U-shaped clamp disposed for positively holding said sections together in the closed position thereof, a mounting fixed to said frame for slideably supporting said clamp, a horizontal rack bar fixed to said clamp, gear means engaging said rack bar, a vertical rack bar slideably mounted in said mounting and engaging said gear means, and a hydraulic cylinder for moving said vertical rack bar and whereby the clamp is moved into and out of positive holding relation with said gun sections, said gun sections being adapted to receive said dummy cartridge and fuze when in the closed position.

3. In an apparatus for heat testing a fuze mounted on a dummy cartridge and comprising, in combination, a supporting frame, a first half section of a gun barrel fixedly suspended from said frame, a second half section of a gun barrel complementary to said first half section hingedly suspended from said frame and adapted to move from an open to a closed position with respect to said first half section, said sections in the closed position forming in effect a complete gun barrel, means including a hydraulic cylinder for moving said second half section from an open to a closed position, said half sections being adapted to receive said dummy cartridge and fuze when in the closed position, slidable clamping means of generally U-shaped form adapted to engage and positively hold said half sections in the closed position, and means including a hydraulic cylinder for moving said clamping means into and out of engagement with said sections.

4. Apparatus for heating a gun barrel to simulate heat developed therein during normal operation thereof and comprising, in combination, a frame, a pair of complementary half sections of a gun barrel, said gun barrel being split along the length thereof, said half sections being suspended in side by side relation on said frame, the split faces of each section facing downward, a plurality of means for heating said sections to selected temperatures along the length thereof positioned beneath said sections and vertically adjustable relative thereto.

5. Apparatus for simulating the temperatures developed in a gun tube during normal use comprising, in combination, a rectangular frame, a pair of gun tube half sections suspended therefrom, said half sections being complementary to each other, the first of said sections being fixed to said frame, the second of said sections being hingedly connected to said frame for movement from an open position to a closed position, said sections in the closed position in effect forming a whole gun tube, hydraulic means for moving said second section from said open position to said closed position, a generally U-shaped clamping member slidably mounted in said frame and movable into and out of engagement with said gun tube sections when said sections are in the closed position, aligning and spacing means for said sections whereby accurate alignment of the sections in the closed position is accomplished and a predetermined spacing thereof is maintained and heat producing means for heating the sections.

References Cited in the file of this patent

UNITED STATES PATENTS

| 1,204,282 | Lake | Nov. 7, 1916 |
| 1,302,720 | Schultz | May 6, 1919 |
| 1,922,320 | Olin et al. | Aug. 15, 1933 |
| 2,431,683 | Biggar | Dec. 2, 1947 |
| 2,440,634 | Henney | Apr. 27, 1948 |
| 2,448,203 | Africano | Aug. 31, 1948 |
| 2,499,944 | Brace et al. | Mar. 7, 1950 |

FOREIGN PATENTS

| 377,500 | Great Britain | July 28, 1932 |

OTHER REFERENCES 1938 preprint of a paper presented before A. S. M. convention in Detroit October 17–21, 1938, by W. H. Snair and W. P. Wood entitled "The White Layer Structure in the Erosion of Machine Gun Barrels," 15 pages.